Jan. 10, 1956  H. F. BUDZIEN  2,729,981
REVERSIBLE POWER TRANSMISSION MECHANISM
Filed Aug. 2, 1951  3 Sheets-Sheet 1

INVENTOR.
Hugo F. Budzien
BY

Jan. 10, 1956     H. F. BUDZIEN     2,729,981
REVERSIBLE POWER TRANSMISSION MECHANISM
Filed Aug. 2, 1951     3 Sheets-Sheet 2

INVENTOR.
Hugo F. Budzien
BY
Paul L. Kesler
Atty.

Jan. 10, 1956     H. F. BUDZIEN     2,729,981
REVERSIBLE POWER TRANSMISSION MECHANISM
Filed Aug. 2, 1951     3 Sheets-Sheet 3

INVENTOR.
Hugo F. Budzien
BY
Paul L. Kroher
Atty.

United States Patent Office 2,729,981
Patented Jan. 10, 1956

2,729,981

REVERSIBLE POWER TRANSMISSION MECHANISM

Hugo F. Budzien, Beloit, Wis., assignor to Fairbanks, Morse & Co., Chicago, Ill., a corporation of Illinois Application August 2, 1951, Serial No. 240,001

1 Claim. (Cl. 74—361)

This invention relates to improvements in power transmissions, and concerns more particularly, the provision of a reversible reduction gear type power transmission mechanism of improved construction, including improvements in the arrangement and operative mounting of gear and clutch elements embodied in the mechanism.

In the construction of power transmissions particularly of a heavy duty type suitable for marine service and the like, it is a well known and common practice to arrange the forward and reverse clutch assemblies in relative adjacence on a common axis, and to associate the output of one clutch with a shaft while the output of the other clutch is associated with a second shaft of sleeve-form, disposed coaxially with the first shaft and rotatably journalled thereon. Usually in such arrangements, the shafts rotate in opposite directions which thus imposes high rotative speeds on the moving elements of the bearings between the shafts. Moreover, it is a common practice also, to support the output gears or pinions directly on such shaft elements, in consequence of which the shafts are subjected to detrimental bending stresses, while the shaft bearings are subjected to high bearing loads.

An important object of the present invention then is to provide a power transmission assembly characterized by a construction and arrangement of parts avoiding the foregoing and other material disadvantages inherent in known and heretofore generally prevailing reversible reduction gear mechanisms of the heavy duty type indicated.

Another important object of the present invention to provide a speed transmission mechanism wherein the main forward and reverse driving pinions are rotatably journalled and supported in the transmission housing entirely independently of any drive shaft.

According to the features of the present invention there is provided a closed transmission housing in which two power take-off shafts are rotatably journalled. For convenience, these shafts will be called the forward drive shaft and the reverse drive shaft. An engine crankshaft is coupled in driving engagement with the forward drive shaft which, in turn, continuously drives the reverse drive shaft through meshing gears.

A propeller shaft, mounted in the transmission housing adjacent the two drive shafts, carries a gear which is in mesh with a reverse pinion freely disposed around the reverse drive shaft and a forward pinion freely disposed around the forward drive shaft. A special feature of this invention resides in the manner in which the reverse and forward pinions are mounted concentrically around the associated shafts so that the pinions are journalled for rotation independently of the shafts.

Both the reverse pinion and the forward pinion carry clutch elements which may be selectively moved into engagement with a clutch element on the associated, continuously rotating drive shaft. Thus, when the clutch connecting the forward drive shaft to the forward pinion is energized, the propeller shaft will be rotated in a forward direction. When that clutch is released and the clutch connecting the continuously rotating reverse drive shaft to the reverse pinion is energized, the propeller shaft will be rotated in a reverse direction.

Another object of the invention is to afford a transmission of the character hereinabove generally described, wherein both the forward and reverse drive shafts are in continuous rotation during power input to the transmission, so that either or both of these shafts may be utilized for driving auxiliary equipment as desired.

A further object is to provide a reduction gear assembly as indicated, wherein the several clutch mechanisms are so located therein as to be readily accessible for inspection, servicing or replacement.

The foregoing and other objects, features and advantages of the present invention will be apparent to one skilled in the art, upon consideration of the following detailed description taken in connection with the accompanying drawings:

Figure 4:
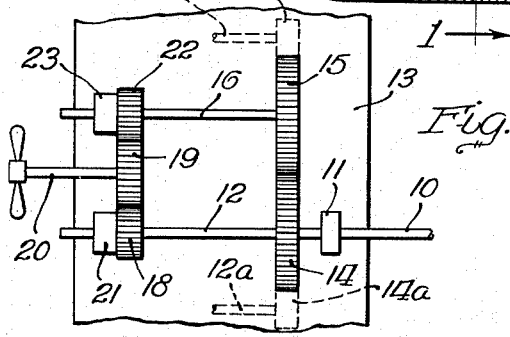
Figure 4 is a diagrammatic view of the power transmission of Figure 1. As shown on the drawings.

Referring first to the schematic showing of Figure 4, the reference numeral 10 indicates an engine crankshaft which is connected by a coupling 11 to a forward drive shaft 12 mounted in a transmission housing or casing 13. A gear 14 is keyed to the shaft 12 and is in mesh with a gear 15 which is keyed to a reverse drive shaft 16. Thus, whenever the engine is running, both the drive shafts 12 and 16 are continuously rotated, but in opposite directions. It will be recognized that, in a modification of the present invention, other power take-off shafts 12a and 16a, shown in dotted lines, could be driven by gears 14a and 15a which could be mounted in the housing 13 in mesh respectively with gears 14 and 15.

The forward drive shaft 12 passes freely through an axial opening in a drive gear 18 which is in mesh with a gear 19 keyed to a propeller shaft 20. A clutch 21 is arranged to connect the gear 18 with the shaft 12 to cause forward rotation of the propeller shaft. The drive shaft 16 passes freely through an axial opening in a drive gear 22 which is also in mesh with the propeller shaft gear 19. A clutch 23 connects the shaft 16 to the gear 22 to effect reverse rotation of the propeller shaft.

In operation, when the engine shaft 10 is rotating and the coupling 11 is connected, the gears 14 and 15, and consequently the shafts 12 and 16 respectively, will be continuously rotated in opposite directions. When the controls are actuated to engage clutch 21 and disengage clutch 23, the propeller shaft will be driven in a forward rotation through the shaft 12. When the control is actuated to disengage clutch 21 and engage the clutch 23, the propeller shaft will be driven in a reverse rotation through the shaft 16.

Figure 1:
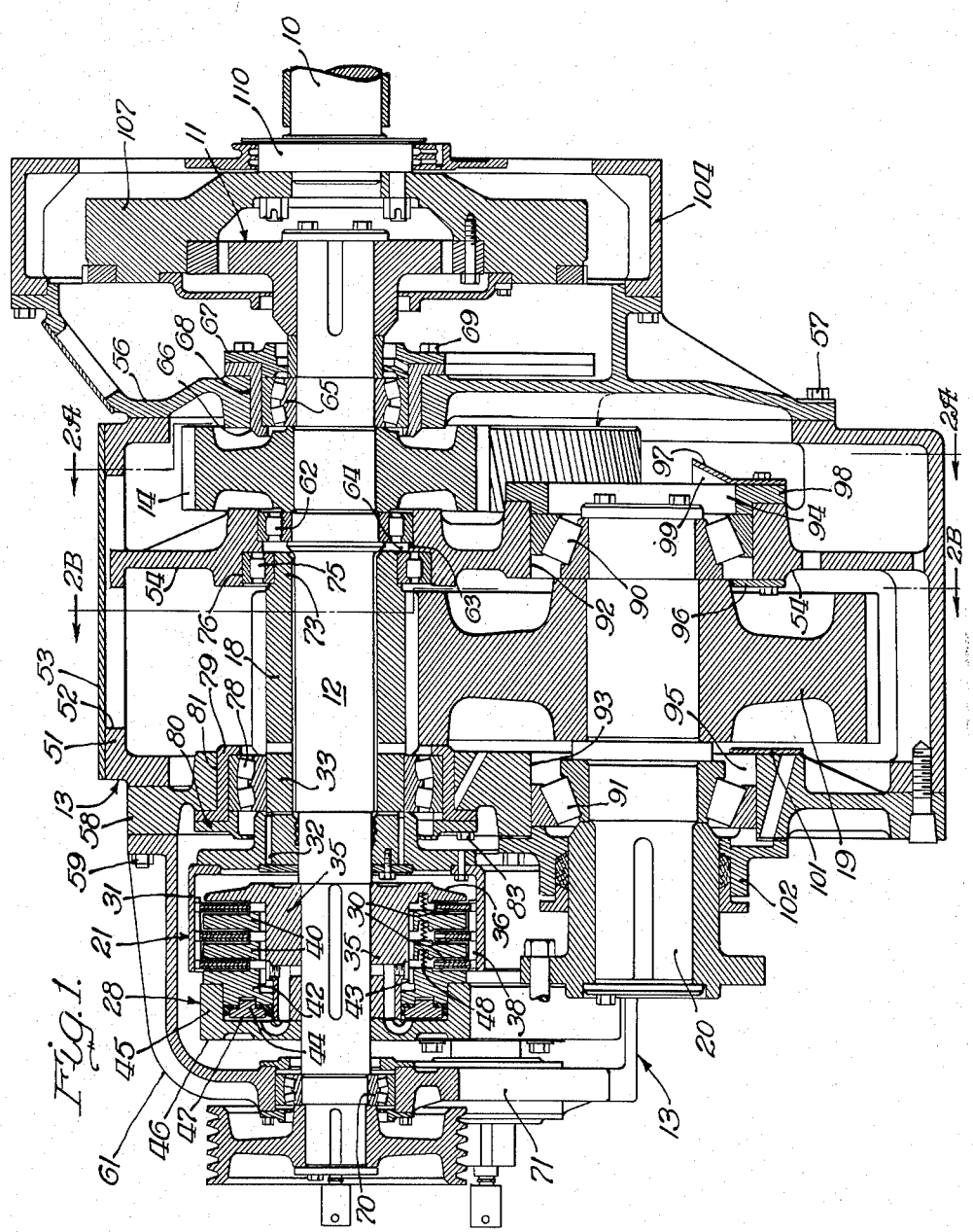
Figure 1 is a vertical sectional view longitudinally throughly the center of a speed transmission mechanism constructed according to the teachings of the present invention.
Figure 2:
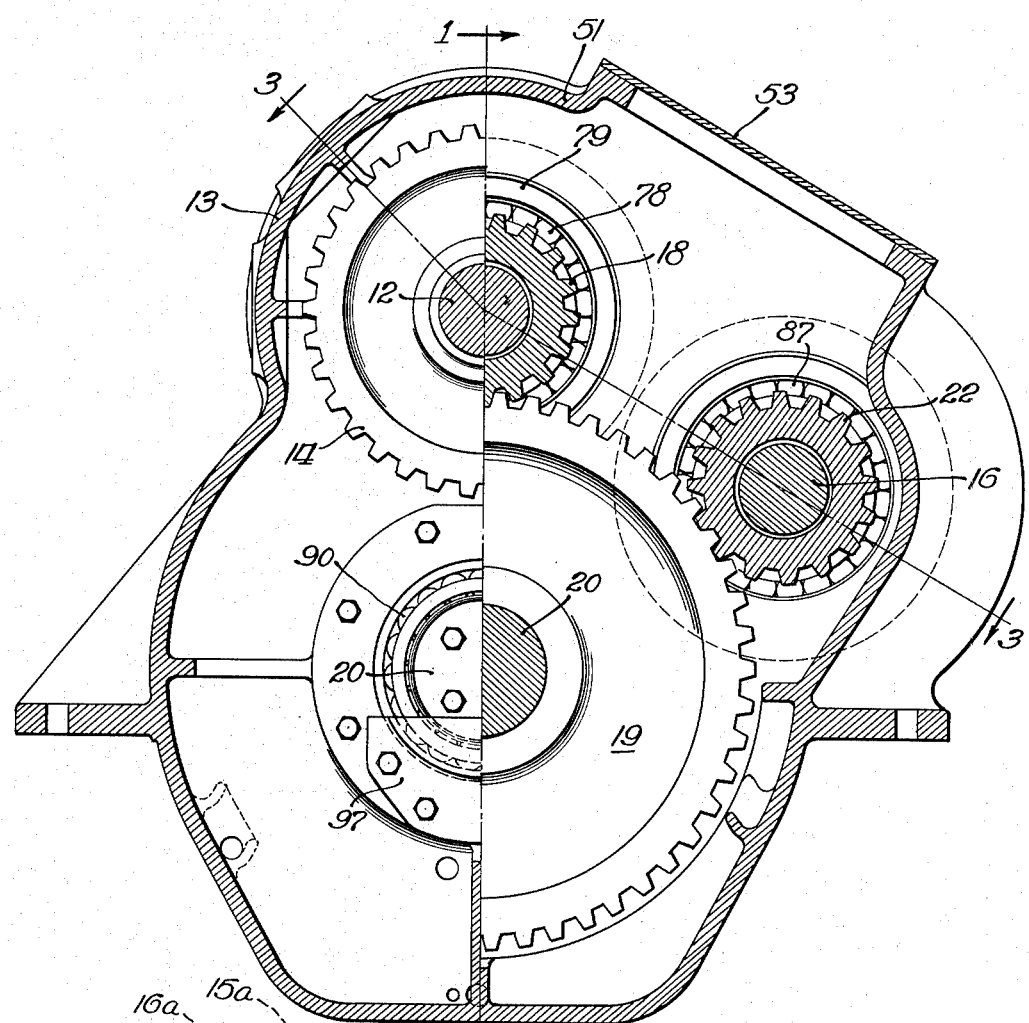
Figure 2 is a vertical sectional view taken in two different parallel planes, the left half of Figure 2 being taken on line 2A—2A of Figure 1 and the right half being taken on line 2B—2B of Fig. 1.

As best seen in Figure 1, which illustrates a preferred embodiment of the invention, the clutch assembly 21 includes a drive member 28 which, through three spaced disc-type clutching elements 30, engages a sleeve 31 that is splined at 32 to an extended hub portion 33 of the forward drive pinion 18. The drive member 28 consists of a generally cylindrical hub 35 that is keyed to the shaft 12. This hub has an enlarged transversely extending flange 36 at its forward end. The disc-type clutching elements 30 are provided at their radially outward peripheral surface with a spline or gear tooth connection 38 to the sleeve 31. A pressure plate 40, which has a splined connection to the hub 35, is disposed between adjacent discs 30. The discs and the pressure plates are moved into mutual gripping engagement through a composite, air-driven piston which includes a forward ring 42 splined to the hub 35 at 43 and a rear ring 44 slidably disposed in air-tight engagement between a portion of the hub 35 and a flange 45 of an end closure member 46 that is secured to the hub 35. It will be understood, of course, that a mechanically actuated or a hydraulically actuated clutch could be used as well as the pneumatic clutch described.

In operation, air under pressure is directed into an annular chamber 47 between the closure member 46 and the ring 44, through a suitable conduit (not shown). When air enters the chamber 47, the movable ring 42 is forced into contact with the adjacent clutching disc 30 which in turn forces the pressure plates 40 into frictional driving engagement with the adjacent discs 30. A suitable mechanism, such as a plurality of springs 48, Figure 1, may be provided for returning the clutch to a disengaged position with the chamber 47 vented to atmosphere. The clutch assembly 23, which is associated with the reverse drive shaft 16 and the reverse pinion gear 22, preferably is identical in construction and operation to the clutch assembly 21.

When the clutch 21 is energized, the propeller shaft 20 will be rotated in a forward direction by means of the gear 19, the forward pinion gear 18, the clutch 21, and the forward drive shaft 12. When the clutch 23 is energized, the propeller shaft will be rotated in a reverse direction through the gear 19, the reverse pinion gear 22, the clutch 23, and the reverse drive shaft 16. It will be understood that the controls (not shown) for energizing the clutches 21 and 23 are provided with a suitable interlocking mechanism so that one clutch is disengaged when the other is engaged. It is to be noted that since both the forward drive shaft 12 and the reverse drive shaft 16 are continuously rotated when the engine is operating, the free ends of the drive shafts are available for power take-off purposes and may be provided with pulleys 50 for that purpose.

The transmission housing 13, Figure 1, includes a longitudinal, generally cylindrical body portion 51 that has a top opening 52 which may be closed by a coverplate 53. An internal transverse wall 54 extends across the interior of the housing 13 substantially equidistant from the ends thereof. An end plate or wall element 56 closes the forward end of the housing 13, being secured thereto by a plurality of bolts 57. An end plate or wall element 58 is secured to the rear end of the housing 13, as by bolts 59. A bowl-shaped clutch housing 61, constituting a part of the main housing 13, encloses the clutch assemblies 21 and 23 and is removably secured to the housing 13 by the same bolts 59 that hold the end plate 58 in place.

The forward drive shaft 12 is journalled near one end in an anti-friction bearing assembly 62 which is disposed between the hub of the gear 14 and a recessed shoulder 63 of an aperture 64 in the transverse wall 54. The shaft 12 is also journalled in an anti-friction, thrust-type bearing assembly 65 which is held between bearing retainer members 66 and 67 and gear 14. The bearing retainer 66 has a generally cylindrical configuration and is disposed in an opening 68 in the front end plate 56. Both bearing retainer members 66 and 67 are secured to the end plate 56 by a plurality of cap screws 69. Near its rear end the shaft 12 is journalled in an anti-friction bearing assembly 70 which is mounted, as by a press fit, in an end closure plate 71 of the clutch housing 61.

The forward pinion gear 18 is mounted concentrically of and in spaced relation to the central portion of the shaft 12. At one end a cylindrical hub portion 73 is disposed in an anti-friction bearing assembly 75 suitably secured in an enlarged diameter bore 76 of the aperture 64 in casing wall 54. It is to be noted that the bearing assemblies 62 and 75 are disposed about the same axis. The pinion gear 18 further is journalled, adjacent its rear end, in an anti-friction bearing assembly 78 which is held between bearing retainers 79 and 80. The retainer 79 has a generally cylindrical outer surface and is disposed in an opening 81 in the casing rear end plate 58. Both of the bearing retainers 79 and 80 are secured to the end plate 58 by a plurality of cap screws 83. It will therefore be recognized that the forward pinion gear 18 is rotatably carried solely by the casing-supported bearing assemblies 75 and 78 for rotation about the axis of the drive shaft 12, so that the pinion is thus mounted entirely independently of the shaft 12.

Figure 3:
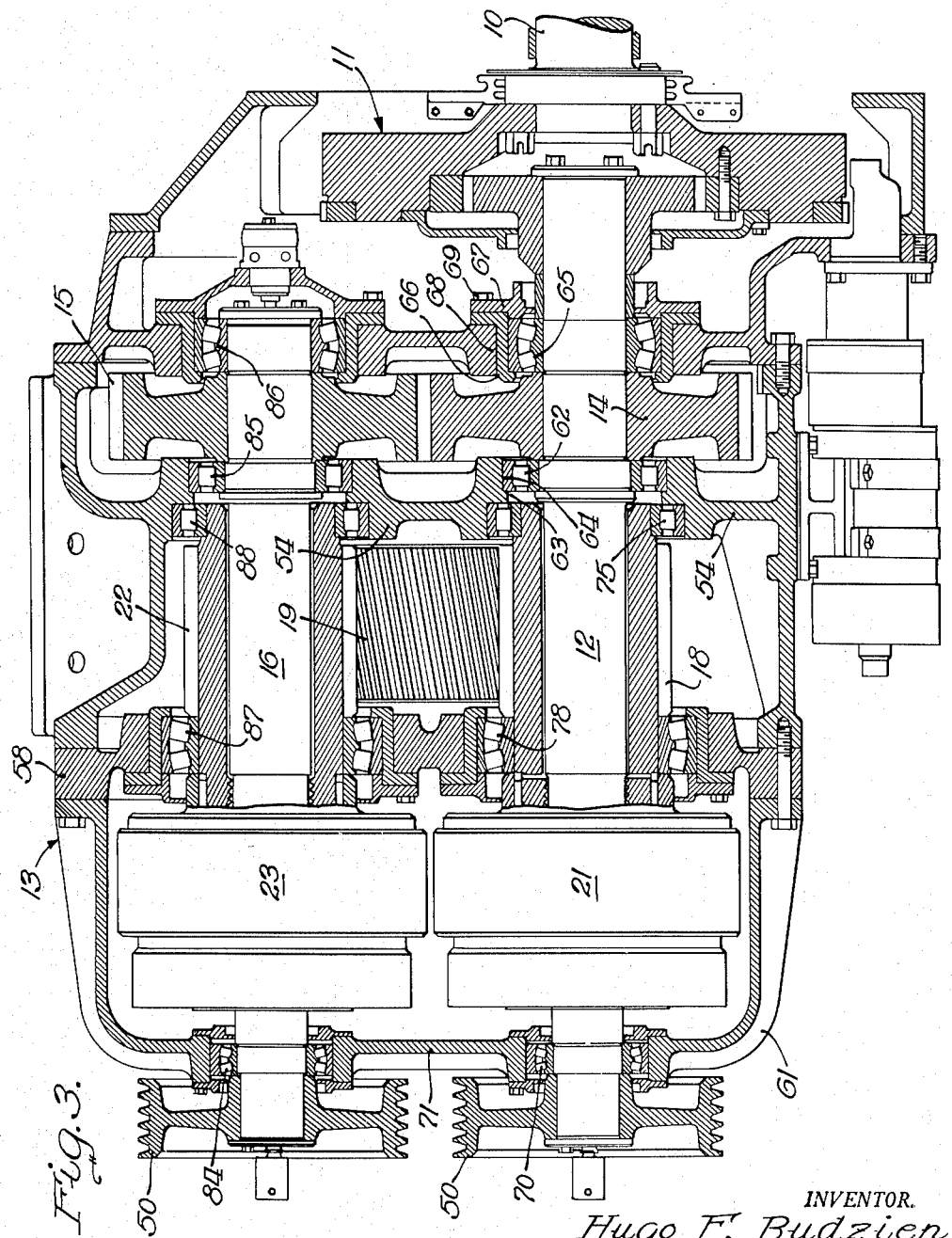
Figure 3 is a sectional view taken on line 3—3 of Figure 2.

The reverse drive shaft 16, Figure 3, is journalled in bearing assemblies 84, 85 and 86 and the reverse pinion gear 22 is journalled in bearings 87 and 88 in the transmission housing in a manner identical to that described in connection with the forward drive shaft 12 and the forward pinion gear 18. It will be understood, of course, that the openings in the transverse wall 54 and in the end plates 56 and 58, which receive the bearing assemblies, are so chosen that in final assembly both the pinion gear 18 and the pinion gear 22 are in mesh with the propeller or output shaft gear 19.

The propeller or output shaft 20, Figure 1, is carried in anti-friction bearing assemblies 90 and 91. The bearing 90 is suitably secured in an axial extending opening 92 in the transverse wall 54, while the bearing assembly 91 is disposed in an opening 93 in the rear end plate 58.

As is evident from the drawings, the transmission housing forms a liquid-tight compartment and suitable oil seals are disposed at all casing joints and at all openings in the end plates 56 and 58. As is common practice, the lower portion of the housing 13 forms a reservoir for lubricating oil. A special feature of this invention is the provision of auxiliary oil reservoirs 94 and 95 around the lower ends of the bearing assemblies 90 and 91. The reservoir 94 is formed by a plate 96 bolted to the rear face of the wall 54 and extending substantially to the center line of the anti-friction element in the bearing assembly 90 to form a pocket on one side of the bearing. On the opposite side of the bearing, a plate 97 is bolted to a retainer ring 98 and extends above the center line of the bearing. The plate 97 has a forwardly protruding lip portion 99 which acts as an oil catcher to collect and direct oil into the pocket or reservoir formed between the plates 96 and 97 around the bearing assembly 90.

The reservoir 95 is formed along the lower end of the bearing assembly 91 by a plate 101 bolted to the front face of the rear end plate 58, and by an annular oil retainer member 102 which is bolted to the rear face of the end plate 58. The pocket formed between the plates 101 and 102 will maintain oil at a level sufficient to lubricate the roller elements as they move therethrough.

At the extreme forward end of the transmission assembly a box-like enclosure member 104 is secured to the front end plate to enclose the coupling 11 which connects the engine crankshaft 10 to the forward drive shaft 12. This closure member is, of course, provided with an opening through which the crankcase extends. A weighted fly wheel 107 may be secured by bolts 108 to the flange 110 of the crankshaft.

From the foregoing description, it will be seen that there is provided by this invention, an improved and compact, efficient power transmission assembly having a forward pinion drive gear and a reverse pinion drive gear which are supported in the transmission entirely free of the drive shafts around which they are mounted. Thus no unnecessary bending stresses are set up in the drive shafts during the operation of the mechanism even though a compact short-lengthed transmission arrangement is used wherein the drive gears are mounted intermediate the ends of the shafts.

Also it is evident that the provision of the clutch assemblies at the rearmost end of the transmission unit provides an arrangement whereby the servicing or replacement of the clutches can be accomplished with no disturbances of the main drive connections of the unit. All that is necessary to gain access to the clutch assemblies, is the removal of the drive pulleys 50 from the drive shafts and the removal of the clutch housing 61.

It will be understood that modifications and variations may be effected without departing from the scope of the novel concepts of the present invention.

I claim as my invention:

A reversible power transmission assembly for operatively connecting a prime mover and means to be driven thereby, comprising a casing open at each end and providing an internal wall transversely in the casing intermediate the casing ends, said wall dividing the casing interior into first and second casing chambers, a first removable end wall closing the open end of the casing adjacent said first casing chamber, a second removable end wall closing the open end of the casing adjacent said second casing chamber, a pair of power input shafts extending longitudinally of the casing through said internal wall and said first and second end walls, bearings carried by said internal wall and said first end wall rotatably supporting said shafts over corresponding end portions thereof, a housing removably carried by the casing and projecting outwardly from said second end wall, bearings carried by said housing and rotatably supporting the opposite corresponding ends of said power input shafts, enmeshing gear elements in said first casing chamber with one such gear element secured upon each power input shaft, provided for interconnecting the shafts for conjoint rotation thereof in opposite directions, a pair of pinion members in said second casing chamber, one thereof for each power input shaft and each being in radially spaced concentric relation to its associated shaft, bearings in said internal wall and said second end wall rotatably supporting said pinion members independently of said shafts, clutch means on each shaft end in said housing, for selective connection and disconnection of the shaft relative to its associated pinion member, a power output shaft extending across said second casing chamber and projecting from the casing, bearings in said internal wall and said second end wall rotatably supporting said output shaft, and a gear member secured upon the output shaft in said second casing chamber, said pinion members being in constant mesh with said gear member.

References Cited in the file of this patent

UNITED STATES PATENTS

| | | |
|---|---|---|
| 870,202 | Sponsel | Nov. 5, 1907 |
| 1,662,301 | Coykendall | Mar. 13, 1928 |
| 2,221,387 | Smith | Nov. 12, 1940 |
| 2,303,168 | Maier | Nov. 24, 1942 |
| 2,443,313 | Gerst | June 15, 1948 |
| 2,535,904 | Davis | Dec. 26, 1950 |
| 2,536,737 | Gerst | Jan. 2, 1951 |
| 2,536,897 | Wood | Jan. 2, 1951 |
| 2,549,078 | Gerst | April 17, 1951 |
| 2,600,022 | Prutton | June 10, 1952 |